Sept. 25, 1945.  C. L. SHUE ET AL  2,385,424
LEVEL
Filed Oct. 9, 1942   2 Sheets-Sheet 1

INVENTORS
Fred J. Allgeo
Clyde L. Shue
ATTYS

Sept. 25, 1945.  C. L. SHUE ET AL  2,385,424
LEVEL
Filed Oct. 9, 1942  2 Sheets-Sheet 2

INVENTORS
Fred J. Allgeo
Clyde L. Shue
BY
ATTORNEYS

Patented Sept. 25, 1945

2,385,424

UNITED STATES PATENT OFFICE 2,385,424

LEVEL

Clyde L. Shue, Coronado, Calif., and Fred J. Allgeo, Reno, Nev.

Application October 9, 1942, Serial No. 461,398

8 Claims. (Cl. 33—215)

This invention relates in general to improvements in levels and is directed particularly to a mechanical gravity actuated level as distinguished from a spirit level.

The principal object of this invention is to provide a mechanical gravity actuated level which is arranged to indicate deviations in all directions from perpendicular or from horizontal, depending on the use to which the device is put; the device while being of universal application being especially designed for use in connection with a posture machine to locate centers of gravity of a human body.

A further object of the invention is to provide a mechanical gravity actuated level constructed to give an accurate reading in degrees through a wide range; inaccuracy due to friction being reduced to a negligible amount.

An additional object of the invention is to provide a mechanical gravity actuated level which, in a housing, includes a universally mounted pendulum assembly having an upstanding pointer which reads on a scale marked on a transparent hemispherical cover or dome carried by said housing; the pivot point of the pendulum assembly and its pointer being in common with the center point of said dome.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views.

Figure 1:
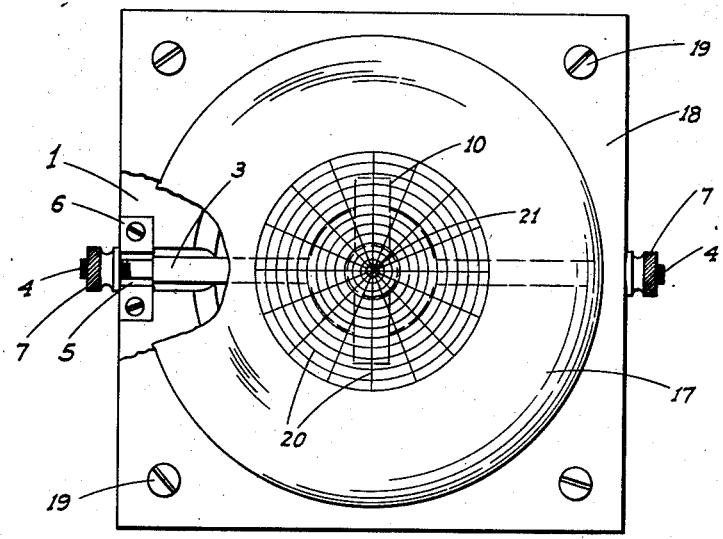
Figure 1 is a plan view, partly broken away, of the device.

Referring now more particularly to the characters of reference on the drawings, and particularly at present to Figs. 1 to 4, the device comprises an open top box 1 which is square in top plan and includes a bottom 2 disposed at right angles to the sides of the box.

A pendulum assembly, hereinafter described, is mounted in connection with the box, and is supported by a horizontal bar 3 which extends between opposite sides of the box, adjacent their upper edges, parallel to and centrally between the remaining sides; said bar being threaded at its ends, as at 4, and said ends projecting through upwardly opening slots 5 in metal blocks 6 mounted on said opposite sides of the box. Thumb nuts 7 are threaded onto the ends of the bar and frictionally engage blocks 6; the slots 5 being oversize to permit of both vertical and horizontal adjustment of the bar at its ends.

Figure 4:
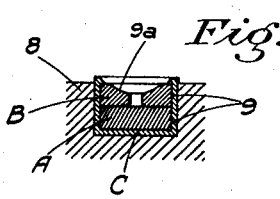
Figure 4 is a greatly enlarged section of the hole and cap jewel bearing.

Intermediate its ends, and centrally of the box, the bar is formed with an inverted hemispherical body 8 of relatively small diameter but which stabilizes or strengthens the bar against downward deflection; the top of the body 8 being flat and in the center is fitted with a hole and cap jewel bearing unit indicated generally at 9. As shown in Fig. 4, this unit comprises a cap bearing A, and a hole bearing B, forming an upwardy facing seat 9a, superimposed on bearing A and confined therewith in a housing C, which is substantially countersunk in the body 8.

Figure 2:
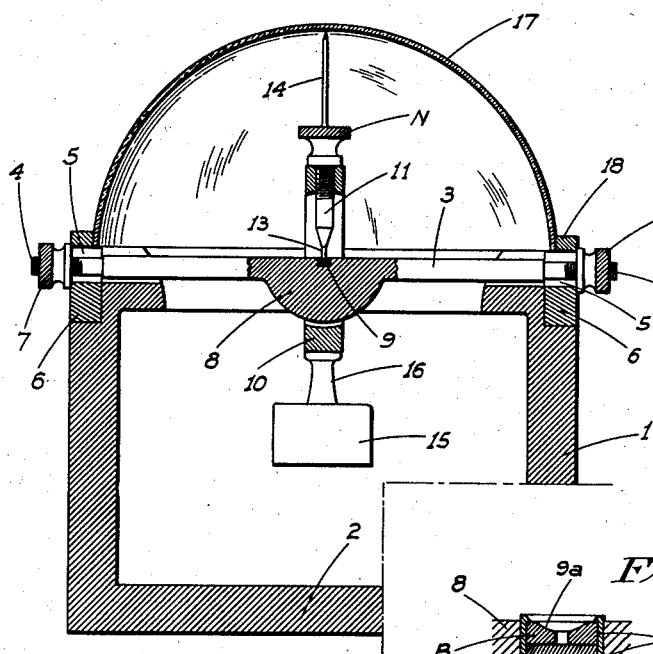
Figure 2 is a transverse sectional elevation of the device.
Figure 3:
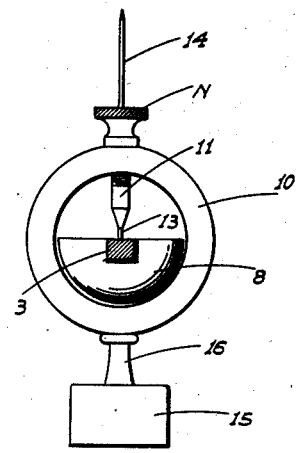
Figure 3 is a fragmentary cross-section on line 3—3 of Fig. 2.

The pendulum assembly comprises a metal ring 10 disposed with its axis horizontal; said ring surrounding the bar 3 and body 8 in centered relation to bearing seat 9. The body at the bottom is close to the ring and the adjacent surface of the ring is matchingly concave as shown in Fig. 2.

A vertical stem 11 is threaded diametrally through the ring 10 at the top; the lower end of said stem being formed as a downwardly pointed needle 13 which engages in seat 9a, while the upper end of the stem is formed outside the ring as a pointer 14 of some length. A thumb nut N on the stem permits of ready adjustment thereof. A pendulum weight 15 is suspended rigidly from ring 10 at the bottom by means of a neck 16.

A cover 17, in the form of a thin, transparent dome, is mounted on the top of box 1 by means of a plate 18 which surrounds and holds the dome at the bottom against upward displacement; such plate being symmetrical to the box and secured thereto by screws 19. This transparent dome is mounted so that its center is common to the pivot point 9 of the pendulum assembly; the pointer 14 terminating very close to but spaced from the inner surface of said dome.

The dome is marked with a scale 20 which includes a plurality of equally spaced circumferential and radial lines representing predetermined deviations from the top center point 21, which point, as well as seat 9a, is in a perpendicular line at right angles to base 2. As is apparent, the dome may be scaled to any extent necessary and to read in degrees, minutes, etc., as desired.

The bar 3 is adjusted so that the pointer 14 reads on center point 21 when the lower surface of bottom 2 rests in a true horizontal plane, and thereafter any deviation of the box from or relative to said plane will be reflected in an accurate reading by pointer 14 on scale 20.

Figure 5:
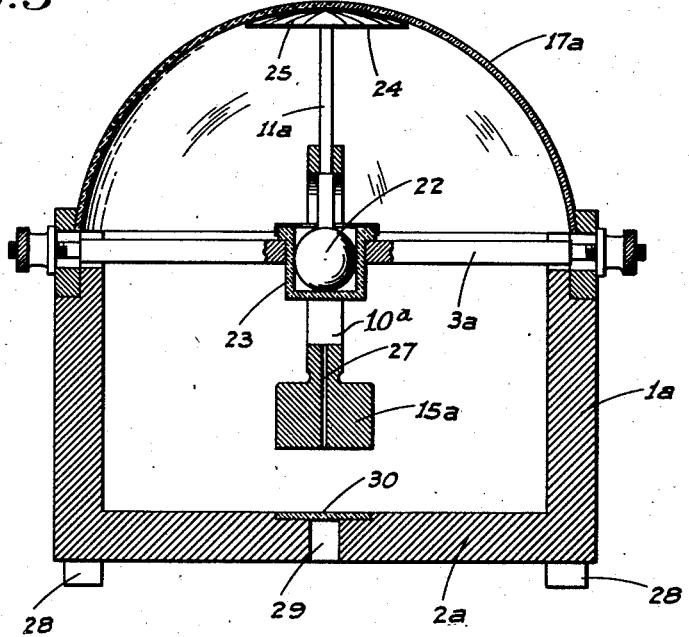
Figure 5 is a sectional elevation of a modified form of level.
Figure 6:
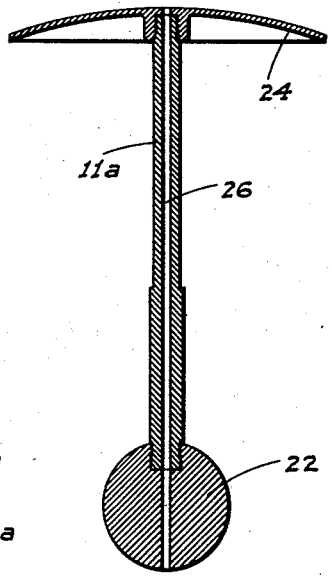
Figure 6 is an enlarged sectional elevation of the pointer or indicator unit.
Figure 7:
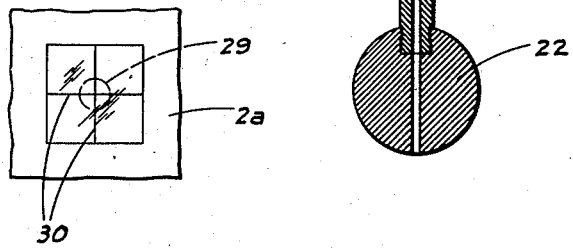
Figure 7 is a fragmentary plan of the orificed box bottom, showing the cross-hair arrangement.

In the type of level shown in Figs. 5 to 7, the pendulum assembly includes a ring 10a and the stem 11a terminates at its lower end in a relatively large ball 22 instead of a needle; said ball being supported for universal swivel movement in a square-sided glass bearing box 23 which is mounted in and projects through the cross supporting bar 3a in such a position that the center of the glass dome 17a and that of the ball coincide.

The stem is surmounted by a mushroom head 24, fitting closely under the glass dome 17a and concentric therewith, and lined for degrees, etc., as indicated at 25, and in the same manner as the dome.

The stem and ball, which are of metal, are axially passaged as shown at 26, while the pendulum weight 15a below also has a passage 27 therethrough alined with passage 26.

The bottom 2a of the main box 1a of the device is mounted on feet 28 so that light may pass under said bottom when the box is resting on a horizontal surface. The bottom 2a is provided with a central orifice 29 having a cross hair arrangement 30 associated therewith which is centered on a perpendicular line from the center of the ball.

By reason of this arrangement, a sight may be taken from above by looking downwardly through passages 26 and 27 and onto the cross hairs, and the relationship to a true level of the surface on which the box 1a rests (such as a billiard table) may be quickly determined, and a true level condition of such surface restored if necessary.

This sighting through from the stem to the cross hairs is of course made possible by the use of the transparent glass bearing box 23 in which the stem ball 22 is mounted.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. A mechanical gravity actuated level comprising a pendulum assembly including an upstanding ring, a pendulum weight depending rigidly from the lowermost point on the ring, a stem projecting diametrically through the ring at its uppermost point, the inner end of said stem being formed as a needle and the outer end being formed as a pointer, a normally stationary support for said assembly including a seat in which said needle universally engages, and a transparent, hemi-spherical dome mounted in connection with the support over said pointer, the dome being marked with a scale in degrees and parts thereof on which said pointer reads.

2. A mechanical gravity actuated level comprising an initially open top box, a hemi-spherical dome of transparent material mounted on the box in covering relation to said initially open top, a normally stationary bar extending from side to side of the box beneath said dome, an upwardly opening needle seat formed on said bar intermediate its ends, the dome being concentric to said seat, an upstanding ring surrounding the bar in clearance relation, a vertical needle depending from the top of the ring radially thereof and universally engaging in said seat, a vertical pointer projecting upwardly from the top of the ring to a termination adjacent but short of the inner surface of the dome, the latter having a scale on which the pointer reads, and a pendulum weight depending from the bottom of the ring.

3. A level including a body having a flat bottom surface, a transparent dome of substantially hemi-spherical configuration mounted on the body, the dome having scale markings radiating from a top center point thereon, said point and the center of the dome lying in a common line perpendicular to said bottom surface, a pointer to read against the markings disposed within the dome, a pendulum rigid with and depending from the pointer, and mounting means for the pendulum to allow of universal swinging movement thereof about the center of the dome as an axis; said pointer including a mushroom head disposed close under the dome and curved concentric therewith, said mushroom head having scale markings corresponding to those on the dome.

4. A level comprising a support, a pendulum assembly including an upstanding pointer unit having a bearing element on its lower end above and clear of the lower end of the assembly, engaging means for said element mounted on the support to allow of universal swivel movement of the assembly about the axial point of said element and a transparent scale-marked dome fixed with the support over the assembly and against which the pointer unit reads and which is centered at said axial point; said bearing element comprising a ball, the pointer unit extending radially from said ball.

5. A level comprising a support, a pendulum assembly including an upstanding pointer unit having a bearing element on its lower end above and clear of the lower end of the assembly, engaging means for said element mounted on the support to allow of universal swivel movement of the assembly about the axial point of said element, a transparent scale-marked dome fixed with the support over the assembly and against which the pointer unit reads and which is centered at said point; a box in which the support and pendulum assembly are mounted, the assembly having an axial passage therethrough from end to end and the bottom of the box having an opening alined with said passage when the assembly is vertical, and a cross-hair arrangement adjacent and over said opening.

6. A mechanical gravity actuated level comprising a pendulum assembly including an upstanding ring, a pendulum weight at the bottom of the ring, a stem projecting diametrally through the ring at the top, the outer end of the stem being formed as an indicating element, and the inner end of the stem being formed as a pivot element, a normally stationary support for said assembly including a fixed bearing seat in which said pivot element swivelly and universally engages, and a transparent hemispherical dome mounted in connection with the support over said indicating element, the dome being fixed relative to said support and marked with a scale on which said indicating element reads.

7. A mechanical gravity actuated level comprising a pendulum assembly including an upstanding ring, a pendulum weight depending rigidly from the lowermost point on the ring, a stem projecting diametrally through the ring at its uppermost point, the inner end of said stem being formed as a needle and the outer end being formed as a pointer, a support for said assembly including a seat in which said needle engages, and a transparent, hemi-spherical dome mounted in connection with the support over said pointer, the dome being marked with a scale in degrees and parts thereof on which said pointer reads; said stem being threaded through the ring and adapted for longitudinal adjustment.

8. A level including a body having a flat bottom surface, a transparent dome of substantially hemi-spherical configuration mounted on the body, the dome having scale markings radiating from a top center point thereon, said point and the center of the dome lying in a common line perpendicular to said bottom surface, a pointer to read against the markings disposed within the dome, a pendulum rigid with and depending from the pointer, and mounting means for the pendulum to allow of universal swinging movement thereof about the center of the dome as an axis; said pendulum mounting means including a depending needle rigid with the pendulum intermediate its ends below and axially alined with the pointer, and a seat for the needle fixed with the body at the center of the dome.

FRED J. ALLGEO.
CLYDE L. SHUE.